US012722964B2

(12) United States Patent
Loschiavo

(10) Patent No.: US 12,722,964 B2
(45) Date of Patent: Sep. 1, 2026

(54) CONE FILLING APPARATUS

(71) Applicant: Carl Michael Loschiavo, Stratford, CT (US)

(72) Inventor: Carl Michael Loschiavo, Stratford, CT (US)

( * ) Notice: Subject to any disclaimer, the term of this patent is extended or adjusted under 35 U.S.C. 154(b) by 0 days.

(21) Appl. No.: 18/965,441

(22) Filed: Dec. 2, 2024

(65) Prior Publication Data

US 2025/0178878 A1 Jun. 5, 2025

Related U.S. Application Data

(60) Provisional application No. 63/605,346, filed on Dec. 1, 2023.

(51) Int. Cl.
*B67C 11/02* (2006.01)

(52) U.S. Cl.
CPC .................................... *B67C 11/02* (2013.01)

(58) Field of Classification Search
CPC .............. A24C 5/42; A24C 5/40; B65B 39/00
USPC .................................... 141/71–81, 391, 383
See application file for complete search history.

(56) References Cited

U.S. PATENT DOCUMENTS 2,696,336 A * 12/1954 Van Drunen ........... B65B 39/00 222/164
6,105,640 A * 8/2000 Holand ................... B65B 39/00 141/10
10,028,618 B1 * 7/2018 Benson ............... B02C 18/2216
2018/0055087 A1 * 3/2018 Collier ..................... A24C 5/06
2024/0341345 A1 * 10/2024 Perry ....................... A24C 5/42

FOREIGN PATENT DOCUMENTS

GB 2124882 A * 2/1984 ............... A24C 5/42

* cited by examiner

*Primary Examiner* — Timothy P. Kelly

(57) ABSTRACT

A cone filling apparatus having a base, a telescopic support, and a funnel. The telescopic support extends from the base, providing a height adjustable means for supporting the funnel. Further, a tool comprising a scoop and a poker, may further be included within the present invention for scooping and packing a ground substance into a cone.

18 Claims, 7 Drawing Sheets

CONE FILLING APPARATUS

FIELD OF THE INVENTION

The present invention relates generally to a tool. More specifically, the present invention is an apparatus for filling a cone with ground material.

BACKGROUND OF THE INVENTION

A cone is a type of paper that has been pre-rolled into the shape of a cone to simplify the preparation of a cigar, cigarette, or other similar smoking means. Typically, cones are filled with a ground substance, such as tobacco, wherein a user will sprinkle, by hand, a bit of tobacco into the cone. This process is meticulous and oftentimes leads to a mess being made by the user as the ground substance may stick to the user's fingers or simply miss the opening of the cone all together.

The current method of filling a cone requires a user to firmly hold one end of the cone, ensuring that they keep enough pressure on the cone to not compromise the shape of the cone or damage the filter, while also ensuring that the cone does not come undone. Some users, who have fingers that are too large to effectively fill the cone by hand, resort to using paper, folded into a funneled shape, which is a slow and tedious process whereby the ground substance is slowly dispensed into the cone.

After filling the cone, a user must then also pack the cone, pushing down the ground substance into the cone, to ensure an even burn throughout the course of consumption. Often times, a user must scour their environment for a tool that is thin enough to slide into the cone, but dull enough to not cut or puncture the paper. Once a user is finished packing the cone, often times, there will be additional room for additional ground substance, meaning that a user will have to battle once more with the hardship of filling the cone.

An objective of the present invention is to provide a device that allows a user to easily fill and pack a cone with ground substances. The present invention provides a base for holding cones of various widths, a telescopic support to fit a variety of cone lengths, and a funnel for ensuring that all of the ground substance makes its way into the end of the cone. Moreover, in the preferred embodiment, the cone provides a tool for a user to scoop the ground substance into the funnel, that also may be used to pack the ground into the cone.

DETAIL DESCRIPTIONS OF THE INVENTION

Figure 1:
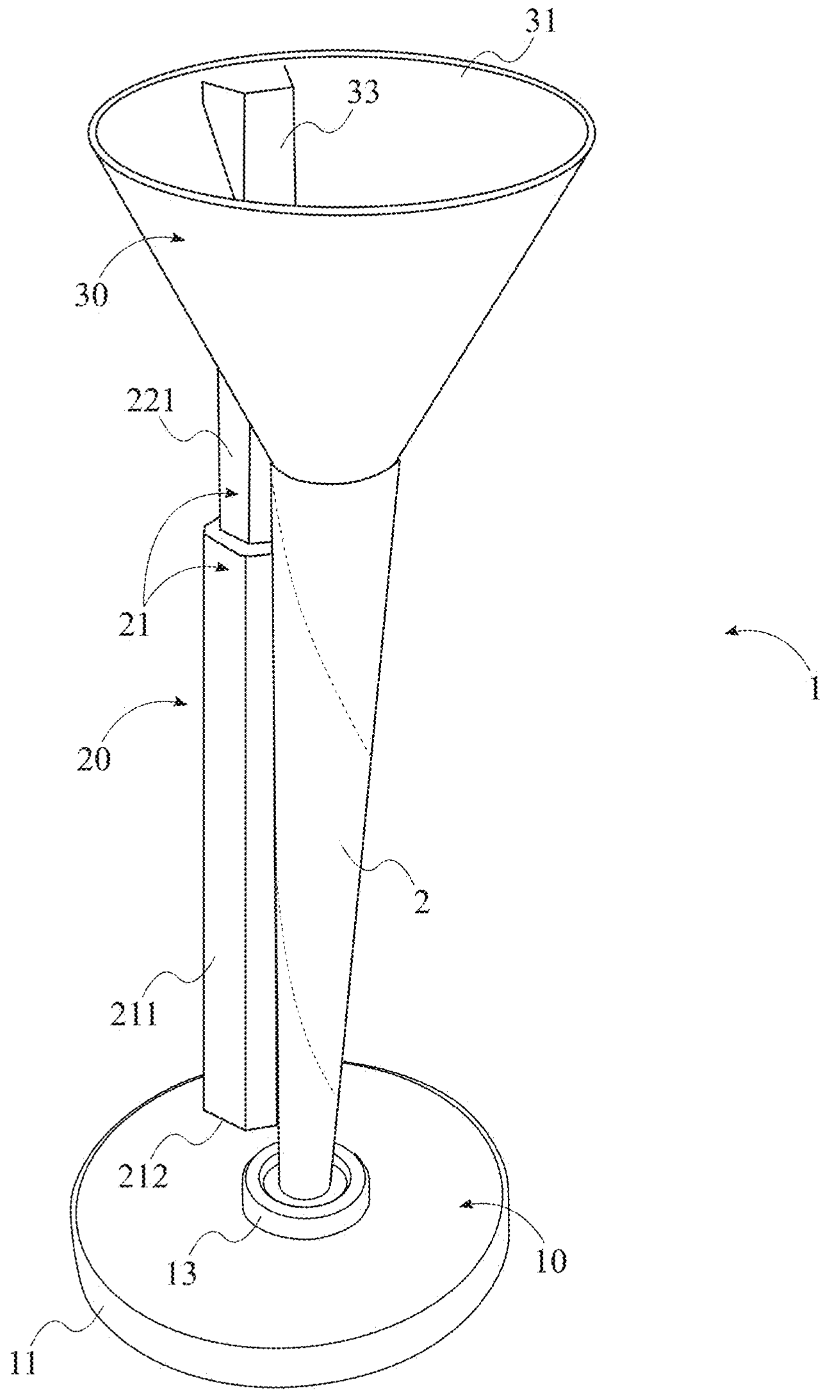
FIG. 1 is a perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a cone filling apparatus, embodiments of the present disclosure are not limited to use only in this context.

As shown in FIG. 1, the present invention is a cone filling apparatus 1 comprising a base 10, a telescopic support 20, and a funnel 30. In the preferred embodiment of the present invention, the telescopic support 20 is removably coupled to the base 10, and the funnel 30 is removably coupled to the telescopic support 20.

Figure 2:
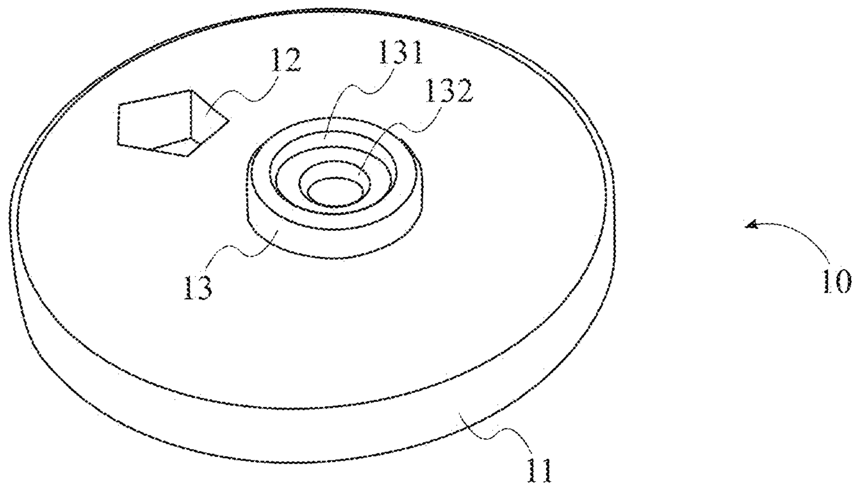
FIG. 2 is a perspective view of the base of the present invention.

The base 10, as shown in FIG. 2, is a circular disk comprising a support receiver 12 and a tip insert 13. The base 10 further comprises a top face and a bottom face wherein the bottom face is the upwardly facing surface of the base 10, and the bottom face is the downwardly facing surface of the base 10, opposite the top face. In the preferred embodiment of the present invention, the support receiver 12 and the tip insert 13 are located on the top face. The support receiver 12 is a polygonal cutout, receiving the telescopic support 20. Likewise, the tip insert 13 is a circular cutout. In the preferred embodiment of the present invention, the tip insert 13 comprises a plurality of concentric cutouts 131,132, wherein the tip insert 13 may receive a plurality of tip sizes of a plurality of cones 2. In the preferred embodiment of the present invention, the tip insert 13 comprises a first cutout 131 and a second cutout 132 wherein said cutouts 131,132 are concentrically aligned cutouts, such that the second cutout 132 is recessed within the first cutout 131, as shown in FIG. 2. In the context of the present invention, a cone 2 is a rolled piece of material, typically paper, comprising a conical shape, wherein a user may fill the conical shaped material with a ground substance, typically for the purpose of smoking.

Figure 3:
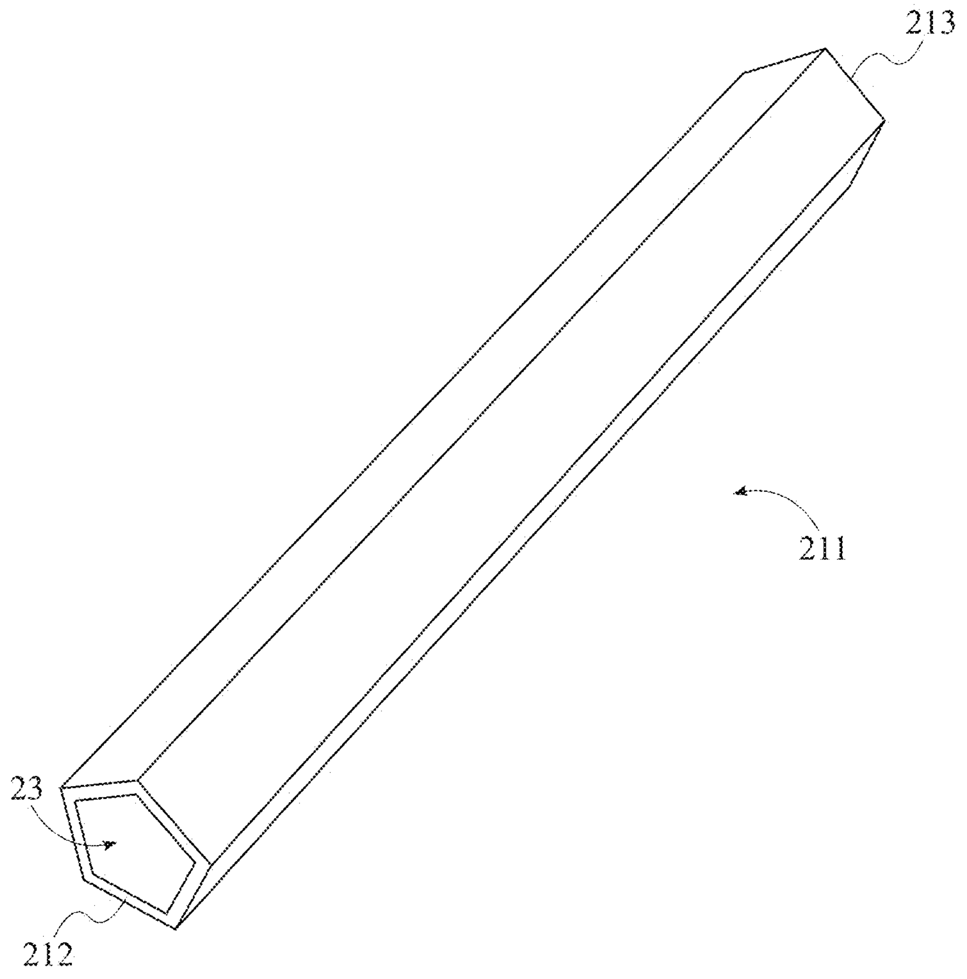
FIG. 3 is a perspective view of the first support rod of the present invention.
Figure 4:
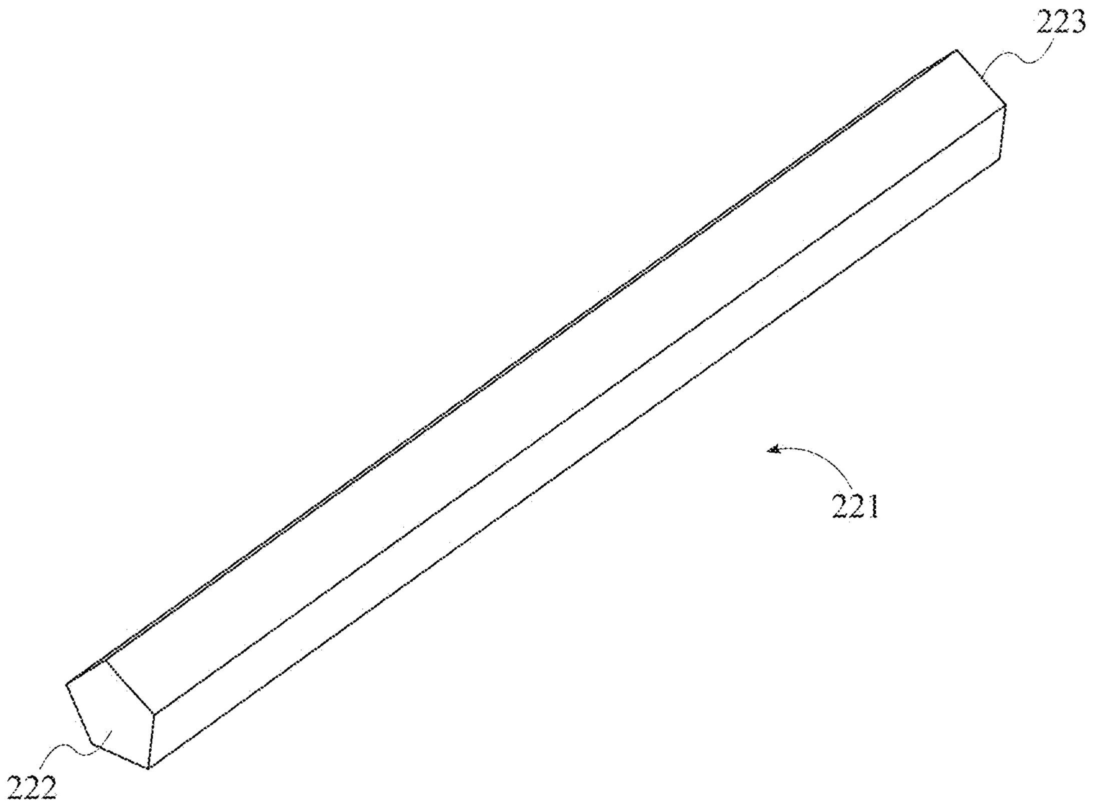
FIG. 4 is a perspective view of the second support rod of the present invention.

In reference to FIG. 3 and FIG. 4, the telescopic support 20 comprises a plurality of rods 21, wherein said plurality of rods is composed of a first rod 211 and a second rod 221 wherein the first rod 211 slidably engages within the second rod 221 to provide a telescopic movement. As shown in FIG. 3, the first rod 211 is a hollowed elongated member comprising a first end 212 and a second end 213, wherein the first end 212 and the second end 213 of the first rod 211 are opposite distal ends. In the preferred embodiment of the present invention, the second rod 221, as shown in FIG. 4, is a solid elongated member comprising a first end 222 and a second end 223, wherein the first end 222 and the second end 223 are opposite distal ends of the second rod 221. In the context of the present invention, the first end 212 of the first rod 211 is removably inserted into the support receiver 12 of the base 10, the second end 213 of the first rod 211 receives the first end 222 of the second rod 221 such that the first end 222 of the second rod 221 slidably traverses within the first rod 211, and the second end 223 of the second rod 221 removably couples to the funnel 30. Additionally, within the preferred embodiment, the first end 212 of the first rod 211 comprises a polygonal shape congruent to that of the support receiver 12 of the base 10, whereby the first end 212 of the first rod 211 removably inserts into the support receiver 12 of the base 10.

Figure 5:
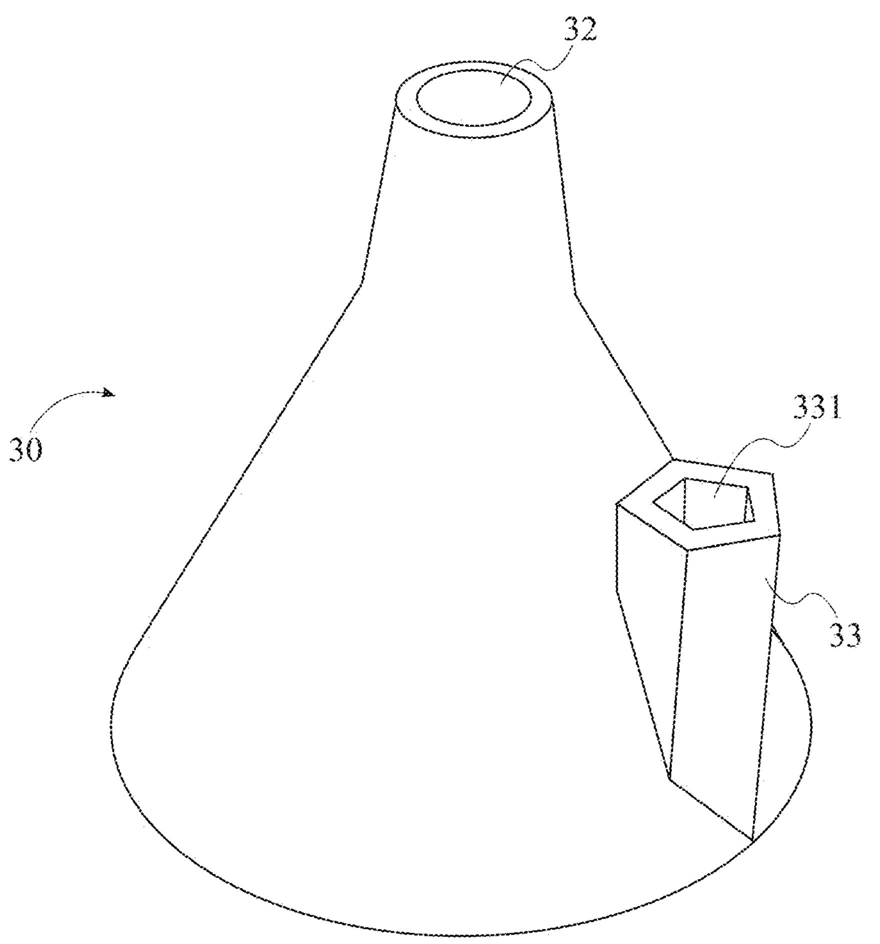
FIG. 5 is a perspective view of the funnel of the present invention.

As shown in FIG. 1 and FIG. 5, the funnel 30 comprises an inlet, a chute 31, an outlet 32, and a support receiver 33. As is understood to those in the art, the inlet is the topmost opening of the funnel 30, the outlet 32 is the bottommost opening of the funnel 30, and the chute 31 is the conical portion of the funnel 30 interposed between the inlet and the outlet 32. Within the context of the present invention, the support receiver 33 is a female connection port on the exterior of the funnel 30, for receiving the second end 223 of the second rod 221 of the telescopic support 20, such that the second end 223 of the second rod 221 is removably inserted into the support receiver 33 of the funnel 30.

Figure 6:
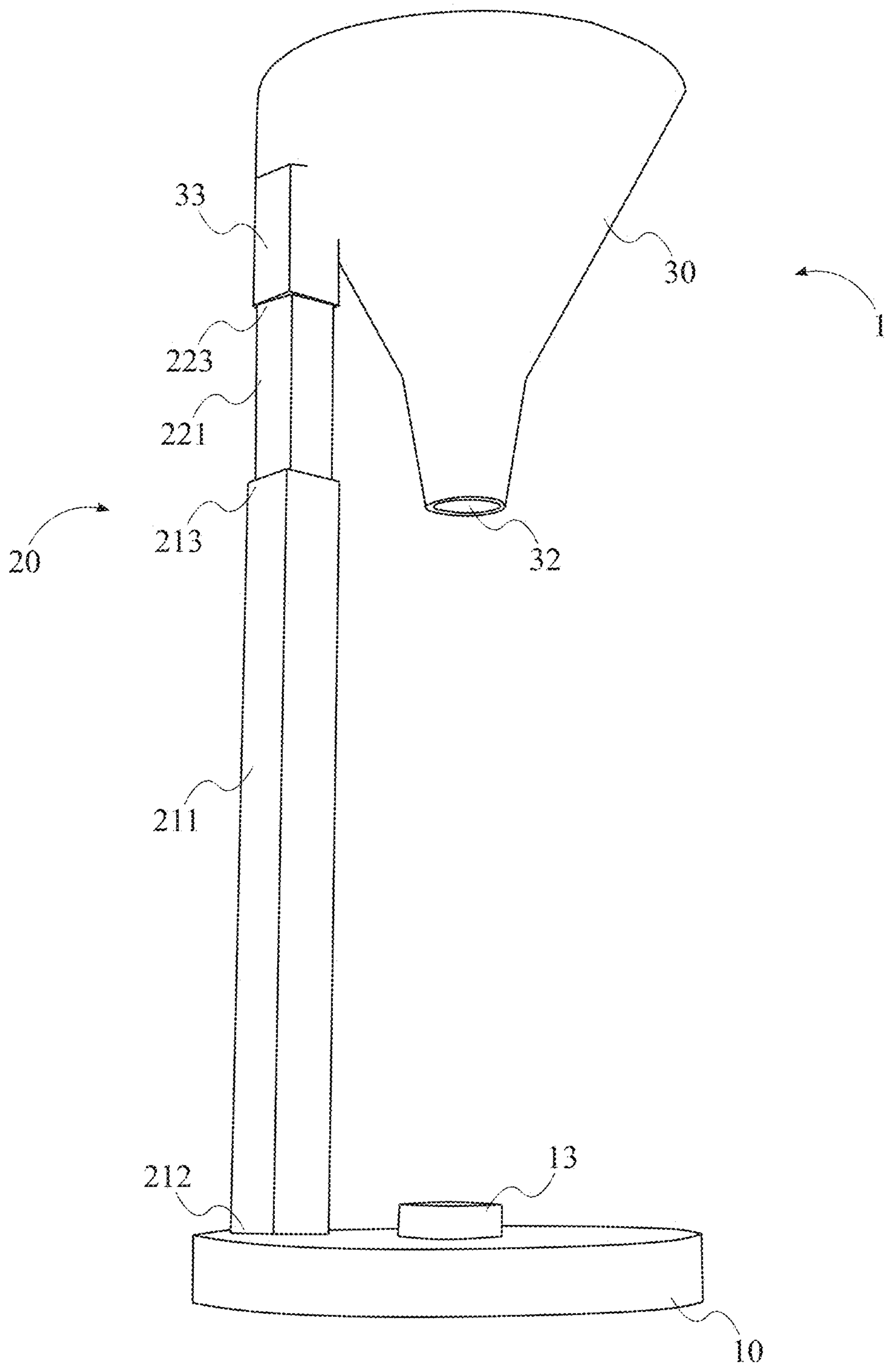
FIG. 6 is an alternate perspective view of the present invention.

As shown in FIG. 6, in the preferred embodiment of the present invention, the telescopic support 20 is interposed between the base 10 and the funnel 30. More specifically, in the context of the present invention, the first end 212 of the first rod 211 removably couples to the support receiver 12 of the base 10 and the second end 223 of the second rod 221 removably couples to the support receiver 33 of the funnel 30. In such embodiments, the first rod 211 and second rod 221, telescopically engage with each other, thereby enabling the user to manipulate the height of the telescopic support 20, and thus the distance between the base 10 and the funnel 30.

In the preferred embodiment of the present invention, as shown in FIG. 1, the cone 2 is held in place by the tip support 13 of the base 10 and the outlet 32 of the funnel 30. Furthermore, within the preferred embodiment of the present invention, the cone 2 is filled by disposing ground substance into the inlet of the funnel 30, while the cone is in place, wherein the ground substance exits the outlet 32 of the funnel 30, into the cone 2. Once the cone 2 is filled, the funnel 30 may be removed and the cone 2 may be removed from the apparatus 1.

In the preferred embodiment of the present invention, the cone filling apparatus is composed of a polylactic acid (PLA) material. The preferred means of manufacture is 3D printing, however manufacturing methods to produce said invention are not limited to such.

Figure 7:
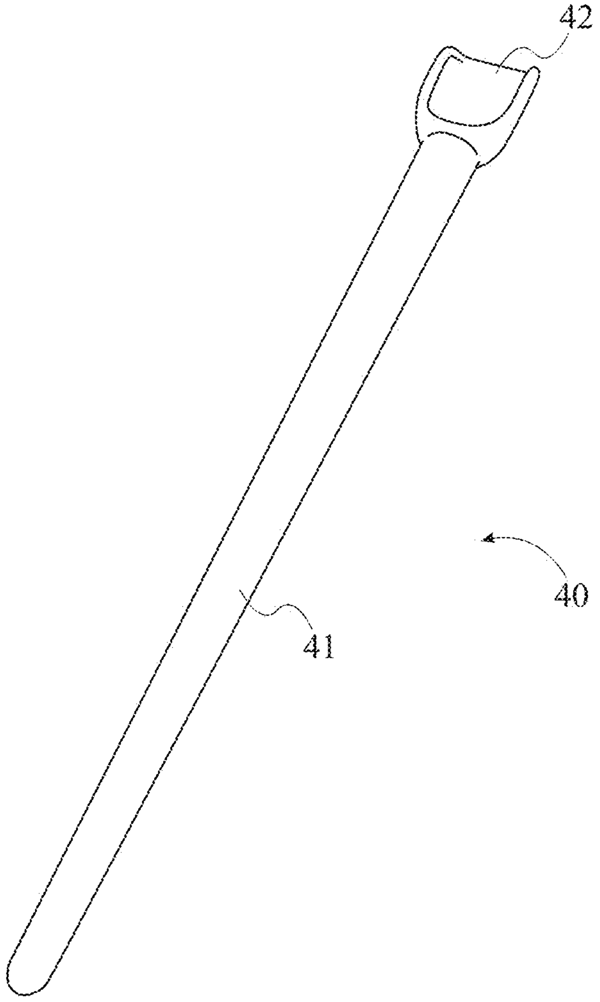
FIG. 7 is a perspective view of the scoop and poker device of the present invention.

In the preferred embodiment of the present invention, the cone filling apparatus 1 further comprises a packing tool 40 wherein said tool is a scoop and a poking device. In said embodiments, as shown in FIG. 7, the tool comprises an elongated member 41, also referred to herein as a handle, comprising two ends: a first end and a second end, wherein the first end comprises a spoon-like construction, also referred to herein as a scoop 42, and the second end comprises a pointed construction. In the context of the present invention, the scoop 42 is positioned at a distal end of the handle. In the preferred embodiment of the present invention, the first end may be used for scooping the ground substance into the funnel 30, whereas the second end may be used for packing the ground substance into the cone. In the preferred embodiment, the second end of the tool comprises a diameter less than the outlet 32 of the funnel 30, thus enabling the second end of the packing tool to be traversable through the outlet hole of the funnel 30, such that a user may pack the ground substance into the cone through the funnel 30. In the preferred embodiment of the present invention, the packing tool disposes ground substance into the funnel 30.

Although the invention has been explained in relation to its preferred embodiment, it is to be understood that many other possible modifications and variations can be made without departing from the spirit and scope of the invention.

What is claimed is:

1. A cone filling apparatus comprising:
a base;
a support; and
a funnel comprising an outlet hole;
wherein:
the base comprises a tip insert;
the support is interposed between the base and the funnel such that the support is offset from the outlet hole of the funnel;
the support is removably coupled to the base;
the funnel is removably coupled to the support;
the tip insert comprises:
a first cutout and a second cutout;
the first cutout is a circular recess;
wherein:
the second cutout is a circular recess; and
the first cutout and the second cutout are concentrically arranged such that the second cutout is recessed into the first cutout.

2. The cone filling apparatus as claimed in claim 1, wherein the base is a disk comprising a support receiver;
wherein:
the support is removably inserted into the support receiver of the base; and
the tip insert is axially aligned with the outlet hole of the funnel.

3. The cone filling apparatus as claimed in claim 2 wherein the support is composed of a plurality of rods wherein said rods move telescopically.

4. The cone filling apparatus as claimed in claim 3, wherein the plurality of rods comprise:
a first rod; and
a second rod;
wherein:
the first rod slidably engages the second rod such that the distance between the base and the funnel is adjustably variable.

5. The cone filling apparatus as claimed in claim 4 wherein:
the first rod is a hollow elongated member comprising:
a first end; and
a second end;
the second rod comprises:
a first end; and
a second end;
wherein:
the first end of the first rod is removably inserted into the support receiver of the base;
the second of the first rod receives the first end of the second rod such that the first end of the second rod slidably traverses within the first rod; and
the second end of the second rod removably couples to the funnel.

6. The cone filling apparatus as claimed in claim 5, wherein the funnel comprises a support receiver.

7. The cone filling apparatus as claimed in claim 6, wherein the second end of the second rod is removably inserted into the support receiver of the funnel.

8. The cone filling apparatus as claimed in claim 2, wherein a cone is interposed between the funnel and the base, such that the cone is held between the tip insert of the base and the outlet hole of the funnel.

9. A cone filling apparatus comprising:
a base;
a support; and
a funnel;
wherein:
the base comprises a tip insert;
the support comprises a first rod and a second rod;
the support is interposed between the funnel and the base;
the first rod of the support is removably coupled to the base;
the second rod of the support is removably coupled to the funnel;
the first rod and the second rod telescopically engage such that the distance between the base and the funnel is adjustably variable;
the tip insert comprises:
a first cutout and a second cutout;
the first cutout is a circular recess;
wherein:
the second cutout is a circular recess; and
the first cutout and the second cutout are concentrically arranged such that the second cutout is recessed into the first cutout.

10. The cone filling apparatus, as claimed in claim 9, wherein the base comprises a support receiver such that the first rod is removably inserted into the support receiver of the base.

11. The cone filling apparatus as claimed in claim 10, wherein the funnel comprises a support receiver such that the second rod removably inserts into the support receiver of the funnel.

12. The cone filling apparatus as claimed in claim 11 wherein the funnel further comprises an outlet hole such the support receiver of the funnel is offset from the outlet hole.

13. The cone filling apparatus as claimed in claim 12 wherein the base comprises a tip insert such that said tip insert is aligned with the outlet hole of the funnel.

14. The cone filling apparatus as claimed in claim 11 wherein:
the first rod is a hollow elongated member comprising:
a first end; and
a second end;
the second rod comprises:
a first end; and
a second end;
wherein:
the first end of the first rod removably inserts into the support receiver of the base;
the second of the first rod receives the first end of the second rod such that the first end of the second rod slidably traverses within the first rod; and
the second end of the second rod removably inserts into the support receiver of the funnel.

15. A cone filling apparatus comprising:
a base;
a support;
a funnel comprising an outlet hole; and
a packing tool;
wherein:
the base comprises a tip insert;

the support is interposed between the base and the funnel such that the support is offset from the outlet hole of the funnel;

the support is removably coupled to the base;

the packing tool disposes ground substance into the funnel;

the funnel is removably coupled to the support;

the tip insert comprises:

a first cutout and a second cutout;

the first cutout is a circular recess;

wherein:

the second cutout is a circular recess; and the first cutout and the second cutout are concentrically arranged such that the second cutout is recessed into the first cutout.

16. The cone filling apparatus as claimed in claim 15, wherein the support is composed of a plurality of rods such that said plurality of rods comprises:

a first rod; and a second rod;

wherein:

the first rod slidably engages the second rod such that the distance between the base and the funnel is adjustably variable.

17. The cone filling apparatus as claimed in claim 16, wherein a cone is interposed between the funnel and the base, such that the cone is held between the base and the outlet hole of the funnel.

18. The cone filling apparatus as claimed in claim 17 wherein the packing tool comprises:

a scoop; and a handle;

wherein:

the scoop is positioned at a distal end of the handle; and the handle is traversable through the outlet hole of the funnel.

* * * * *